United States Patent

Lundblom

[15] 3,688,820
[45] Sept. 5, 1972

[54] EDGER SAW GUIDE

[72] Inventor: Robert E. Lundblom, S.S. 2 Elk Road, Prince George, British Columbia, Canada

[22] Filed: March 22, 1971

[21] Appl. No.: 126,479

[52] U.S. Cl. .................143/160 G, 143/37 R, 143/56
[51] Int. Cl. ..............................................B27b 5/34
[58] Field of Search...143/160 R, 160 G, 37 R, 37 A, 143/37 B, 56 R, 158

[56] References Cited

UNITED STATES PATENTS

| | | | |
|---|---|---|---|
| 328,771 | 10/1885 | Garland | 143/37 R |
| 800,426 | 9/1905 | Calkins | 143/56 |
| 3,568,738 | 3/1971 | Thrasher | 143/160 R |

*Primary Examiner*—Donald R. Schran
*Attorney*—Lyle G. Trorey

[57] ABSTRACT

A guide assembly for a circular saw blade slidable of an arbor, the guide assembly having a pair of supporting members adapted to be secured to a saw frame in side-by-side relationship and on opposite sides of the saw blade, the supporting members having wide end portions which engage each other beyond the saw periphery and which space narrowed central portions clear of the saw blade. The central portion of each supporting member has transversely adjustable guide blocks for slidably engaging the saw blade.

6 Claims, 4 Drawing Figures

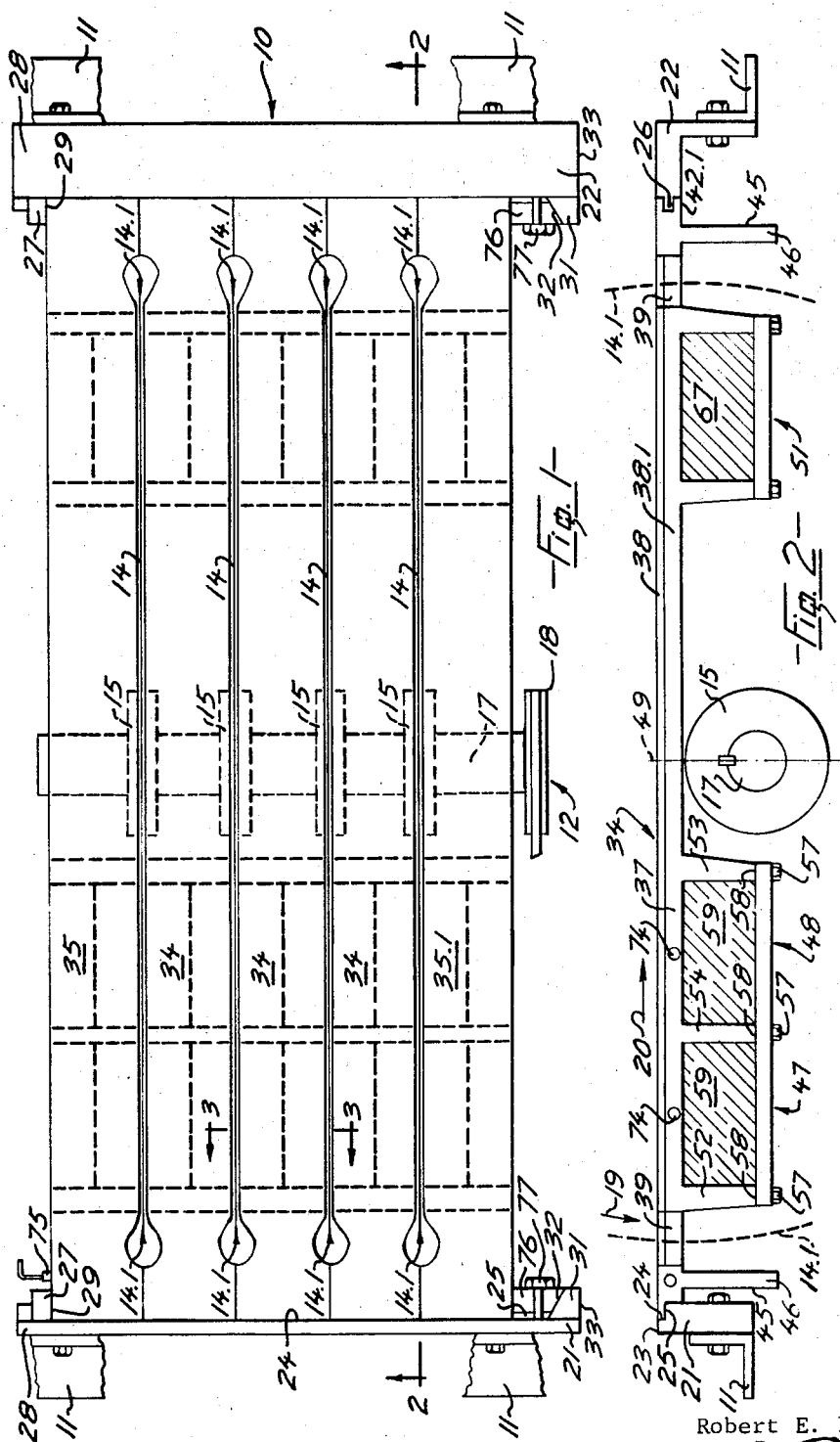

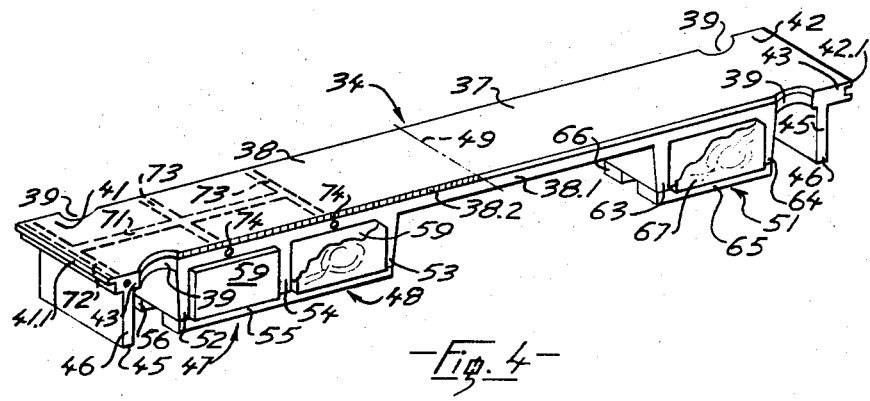
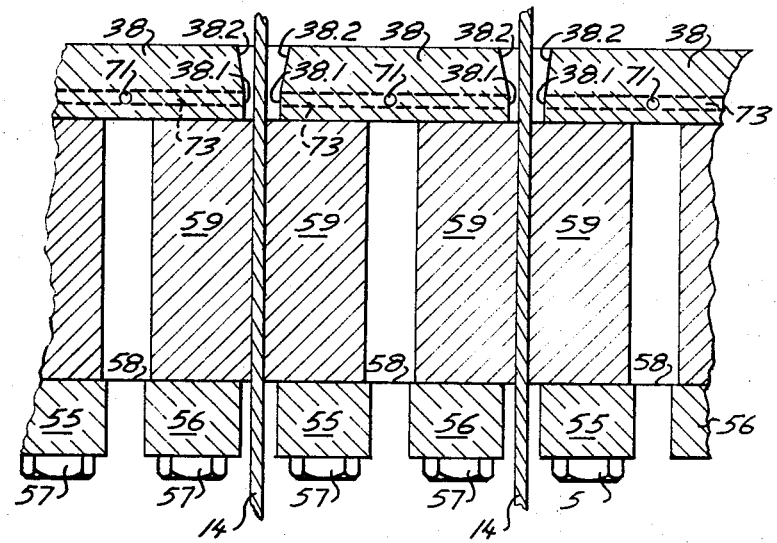

EDGER SAW GUIDE

BACKGROUND OF THE INVENTION

1. Field of the Invention

This invention relates to guides for circular saws particularly saws of a type having a gang of saw blades slidable of an arbor.

2. Prior Art

In gang saws of a type having a plurality of circular saw blades longitudinally adjustable of an arbor, the saw blades are usually keyed to the arbor for rotation but are freely slidable axially.

The saw blades are maintained in axially fixed positions by guides which slidably contact opposite sides of each of the blades, the guides usually being adjustable axially of the arbor so that spacing between the blades can be altered.

In prior art saws of this type it is commonly the practice to use one set of guides which are secured to a saw frame for adjustment longitudinally of the arbor and which, consequently require individual adjustment to vary saw spacing. In order to ensure accuracy, adjustment must be undertaken with great care and is, consequently, time consuming resulting in considerable down time of a saw when adjustment is being made.

SUMMARY OF THE INVENTION

The present invention provides a guide assembly which is easier to adjust than assemblies of prior art and which enables blade spacing to be altered much more readily and faster than prior art assemblies thus reducing down time of the saw when change of blade spacing is being effected.

The guide assembly of the present invention can be assembled and adjusted remote from the saw and then secured to the saw without any further adjustment being necessary.

The guide assembly of the present invention for saws having at least one circular saw blade slidable longitudinally of an arbor, the arbor being journaled in a saw frame includes: supporting members adapted to be extended in pairs in opposite sides of and parallel to the saw blade, each supporting member having opposite end portions extending beyond the saw periphery, end portions of each supporting member being adapted to engage adjacent end portions of an adjacent member, each supporting member having a central portion narrower than the end portions so as to provide clearance for the saw blade. Guide blocks adapted slidably to contact the saw blade are carried by the central portion of each member and means is provided for adjusting the guide blocks transversely of each member. Means is provided on the frame for securing the supporting members in predetermined positions longitudinally of the arbor.

DESCRIPTION OF THE DRAWINGS

FIG. 1 is a plan of a guide assembly mounted on a saw frame, the frame being shown partially only, FIG. 2 is a side view taken, generally, in the direction 2—2, FIG. 1, FIG. 3 is an enlarged sectional view taken on 3—3 of FIG. 1, FIG. 4 is an isometric view of a supporting member and guide blocks secured thereto.

DETAIL DESCRIPTION

FIGS. 1 and 2

FIG. 1 shows a guide assembly, generally 10, mounted on a saw frame 11, shown only partially, which supports a circular gang saw 12. The gang saw which is of conventional and known construction has a plurality, four being shown, of circular saw blades 14 having teeth 14.1 and being secured to collars 15, the collars 15 being keyed, see FIG. 2, on a saw arbor 17 which is journaled for rotation in the frame. The arbor has a pulley 18 which is belt driven from a suitable source of power, not shown. The arbor rotates in a direction indicated by an arrow 19 and lumber to be sawn is moved in a direction as shown by an arrow 20.

The assembly 10 includes a pair of rails 21 and 22 secured to the saw frame, the rails extending parallel to each other on opposite sides of and parallel to the arbor of the saw. The rail 21 has a re-entrant groove, FIG. 2, extending longitudinally of an upper edge 23 to form a vertical abutment face 24 and a horizontal supporting face 25. The rail 22 has an inwardly projecting longitudinally extending tongue 26.

Stops 27—27, FIG. 1, are secured at a pair of adjacent ends 28—28 of the rails, the stops having vertical locating faces 29—29 which are aligned transversely of the arbor. Stops 31—31 having inwardly facing wedging faces 32—32 are secured at ends 33—33 of the rails.

Internal guide pieces 34 located between the saw blades and external guide pieces 35 and 35.1 located on opposite sides of the gang of saw blades, are secured to the rails between the stops.

FIGS. 2, 3, and 4

FIGS. 2 and 4 show one of the internal guide pieces 34. The guide piece 34 includes a supporting member 37 which is made of a length of steel stock of sufficient thickness to span the rails without bending and which has a narrow saw spanning central portion 38 having opposite parallel side edge faces 38.1, FIG. 3, upper side edges 38.2 of which are bevelled back from the arbor and brass coated 38.3, FIG. 4, ahead of the arbor, said faces 38.1 terminating in recesses 39, see particularly FIG. 3. The guide piece has wide end portions 41 and 42 having opposite and parallel side edge faces 43, see FIG. 4.

End edge 41.1 of the end portion 41 is shaped to fit against the faces 24 and 25 of the rail 21 and end edge 42.1 of the end portion 42 is grooved to receive the tongue 26 of the rail 22.

Transversely extending legs 45 depend from each of the end portions 41 and 42, FIGS. 2 and 4, the legs having side edge faces 46 which are flush with the side edge faces 41 and 42 of said end portions.

The central portion 38 has clamps 47 and 48, FIGS. 3 and 4, located to one side of a mid-point 49 of the guide piece 34 and a clamp 51 to an opposite side of said mid-point. The clamps 47 and 48 have end walls 52 and 53 spaced apart on either side of a common middle wall 54. Bridging pieces 55 and 56, see FIGS. 3 and 4, are secured by bolts 57 to lower ends 58 of the walls so as to form rectangularly shaped sockets for receiving rectangularly shaped pair guide blocks, severally, 59 projecting outwards from the opposite side faces 38.1 of the external portion. The clamp 51 is constructed in a similar manner having end walls 63 and 64 to which bridging pieces 65 and 66 are bolted for receiving similar pairs of guide blocks 67.

The guide blocks are made of a soft metal such as babbit or a composition of known construction and, can be adjusted transversely of the supporting member by loosening the bridging pieces of the clamps, moving the guide blocks to the desired positions and then retightening the bridging pieces.

Construction of the exterior guide pieces 35 and 35.1 is substantially the same as that of the interior guide pieces. Guide blocks of the exterior guide pieces are not, however, arranged in pairs.

Width of the end portions 41 and 42 of the guide pieces is such that with side edge faces 43 of said end portion of adjacent guide pieces touching each other the side edge faces of the central portions are spaced apart sufficiently to provide clearance for the saw blade, see FIGS. 1 and 3, clearance of 0.075 inches being considered suitable. Length of the guide pieces is such that the end portions, see FIGS. 1 and 2, extend clear of the saw periphery.

The saw blades and guide blocks are water lubricated. The guide pieces, see FIG. 4, have longitudinal internal water passages 71 intersecting transverse passages 72, the passages 72 of the guide pieces being positioned so that said passages register with each other when the guide pieces are fitted to the frame. Feed passages 73 intersecting the passages 71 have ports 74 which open out of the side edge faces 38.2 of the central portions of the guide pieces above the guide blocks 59. The transverse water passage of the exterior piece 35.1, see FIG. 1, is provided with a water hose fitting 75.

INSTALLATION

FIGS. 1 and 2

In installation of the assembly or the saw frame the guide pieces are fitted to the rails 21 and 22 with the saw blades fitting between adjacent pieces. Wedges 76—76 are then fitted between the exterior guide pieces 35.1 and the stops 31—31 and drawn by bolts 77—77 having a threaded connection with the rails, into wedging engagement with the wedging faces 32—32 of the stops 31 so as to shove all the pieces, as a unit against the stops 27—27. A water line, not shown, is connected to the fitting 75 and a suitable quantity of water continually discharged through the passages and out through the ports 74, the water dripping over the guide blocks thus providing lubrication for the saws. The tongue and groove connection of the supporting pieces with the rail 22 prevents lifting of the pieces when the saw is operated and the legs 45 of adjacent guide pieces which touch each other prevent sideways tilting of the pieces.

It is seen that as the side edge faces 43 of the end portions of each of the guide pieces are in contact with each other and as the stops 27 accurately locate the exterior guide piece 35 longitudinally of the saw arbor, width of the end portions of the guides determines spacing of the saw blades and location longitudinally of the cover. Jigs, consequently, can be used to set up a unit of guide pieces and the guide blocks accurately adjusted with the use of shims representing saw blades at a location remote from the saw so that when the unit of guide pieces is installed and the saw blades assume predetermined positions longitudinally of the arbor without any further adjustment being necessary.

Saw blade spacing can, consequently, be varied easily and quickly with little saw down time, by simply replacing one unit of guide pieces with another unit of wider and prior adjusted guide pieces, the saw blades automatically assuming positions as predetermined on the jig without any further adjustment.

I claim:

1. A guide assembly for a gang saw having at least one circular saw blade slidable longitudinally of an arbor the arbor being journalled in a saw frame, the assembly including:
   a. supporting members adapted to be disposed in pairs on opposite sides and parallel to the saw blade, each supporting member having opposite end portions extending beyond a saw periphery, said end portions of each supporting member being adapted to engage adjacent end portions of an adjacent member,
   b. each supporting member having a central portion narrower than said end portions so as to provide clearance for the saw blade,
   c. guide blocks carried by the central portion of each member for slidably contacting sides of the saw blade,
   d. means for adjusting the guide blocks transversely of each supporting member,
   e. means on the frame for securing the supporting members in predetermined positions longitudinally of the arbor.

2. A guide assembly as claimed in claim 1 in which the means for adjusting the guide blocks includes:
   clamps mounted on the central portions of the supporting members for clamping engagement with the guide blocks, the clamps being adapted to be loosened or tightened so as to enable the guide blocks to be adjusted transversely of the arbor.

3. A guide assembly as claimed in claim 1 in which the means (e) includes:
   i. a pair of rails connected to the saw frame extending parallel to and on opposite sides of the arbor for supporting the end portions of the supporting members,
   ii. first stops on a pair of adjacent ends of the rails for engaging side faces of end portions of one of the supporting members,
   iii. securing means at ends of the rails opposite said pair of adjacent ends operable into engagement with the other one of the supporting member for forcing the supporting members together and against the stops.

4. A guide assembly as claimed in claim 3 in which the securing means includes second stops secured to the rails at the last mentioned ends and wedges adapted to be forced between the second stops and the supporting member adjacent so as to force the supporting members against the first stops.

5. A guide assembly as claimed in claim 1 including stabilizing legs extending from the end portions of each supporting member, the legs of adjacent supporting members being adapted to engage each other so as to prevent sideways tilting of the members.

6. A guide assembly as claimed in claim 1 including water passages extending through the supporting members connectable to a source of lubricating liquid, the passages having ports opening out of side edges of the members above the guide blocks.

* * * * *